E. F. SCHNUCK.
COFFEE ROASTER.
APPLICATION FILED APR. 17, 1918.
1,313,020.
Patented Aug. 12, 1919.
2 SHEETS—SHEET 1.
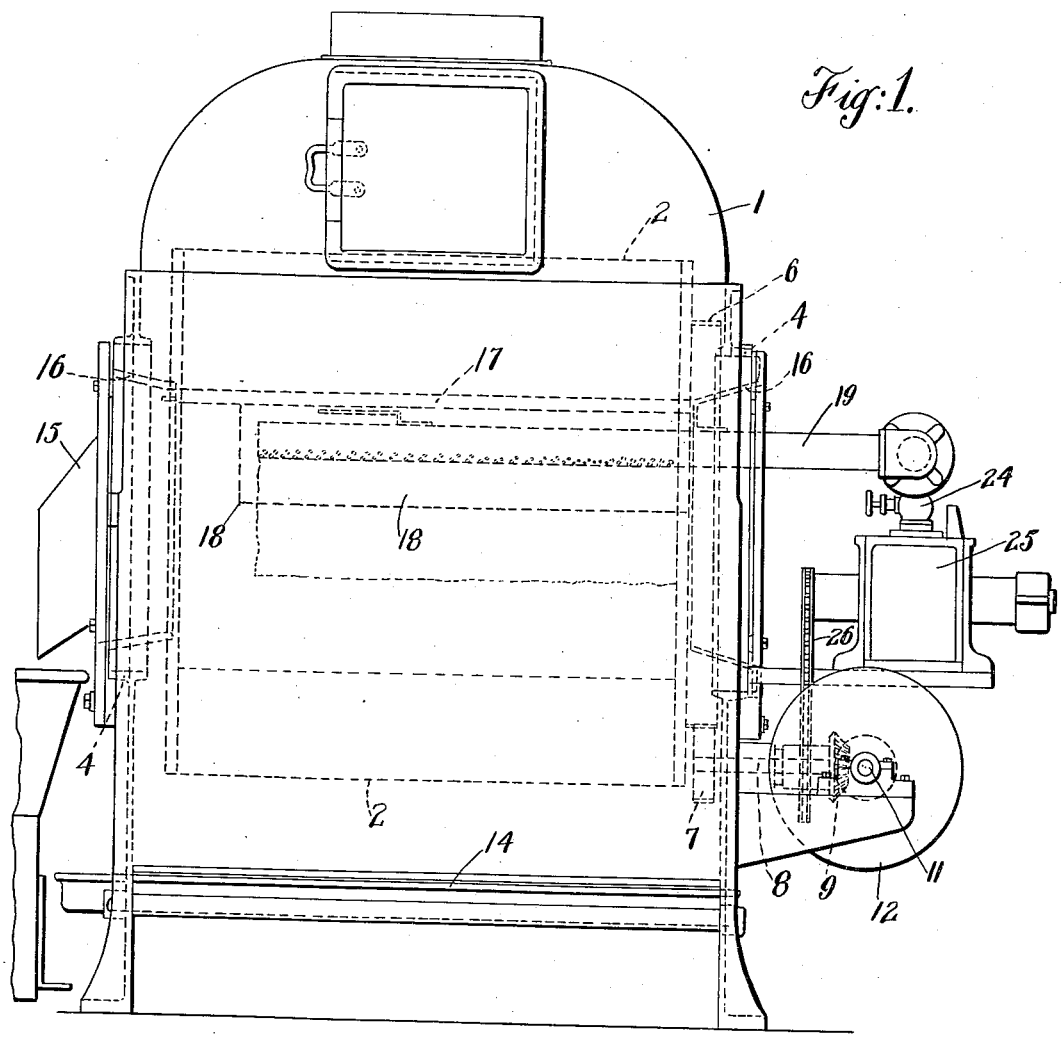
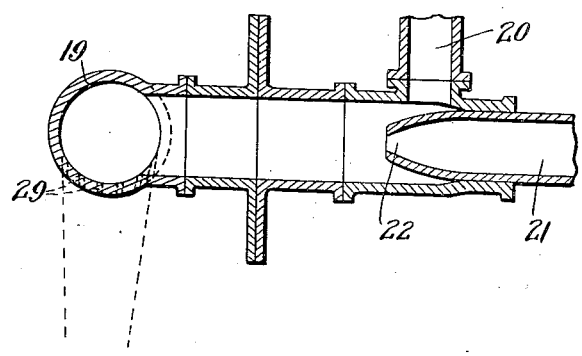

E. F. SCHNUCK.
COFFEE ROASTER.
APPLICATION FILED APR. 17, 1918.
1,313,020.
Patented Aug. 12, 1919.
2 SHEETS—SHEET 2.
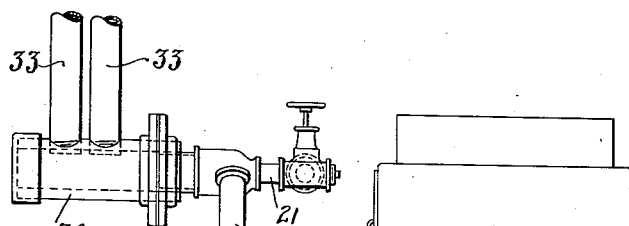
Fig. 5.
Fig. 2.
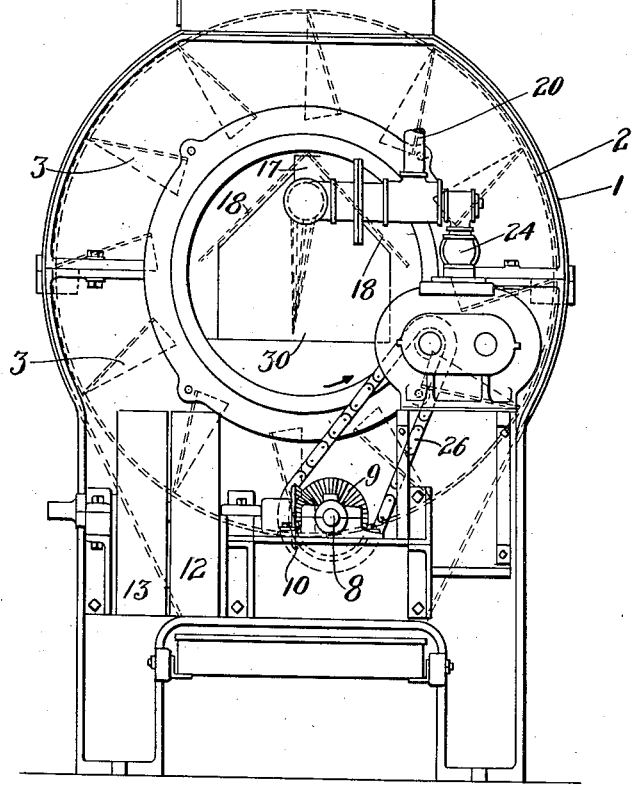
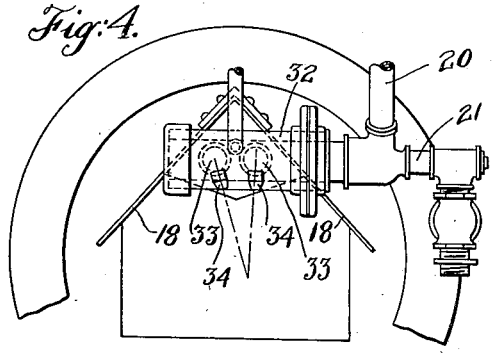
Fig. 4.
INVENTOR
Edward F. Schnuck
BY
J. Wooster
ATTORNEY

UNITED STATES PATENT OFFICE.

EDWARD F. SCHNUCK, OF GREENBURG, NEW YORK, ASSIGNOR TO JABEZ BURNS & SONS, A CORPORATION OF NEW YORK.

COFFEE-ROASTER.

1,313,020. Specification of Letters Patent. Patented Aug. 12, 1919.

Application filed April 17, 1918. Serial No. 229,053.

*To all whom it may concern:*

Be it known that I, EDWARD F. SCHNUCK, a citizen of the United States, and a resident of Greenburg, in the county of Westchester and State of New York, have invented certain new and useful Improvements in Coffee-Roasters, of which the following is a specification.

This invention relates to coffee roasters of the type described in Patent #1,128,101 dated February 9, 1915, and has for its object to improve the efficiency and provide a more uniform result.

Roasters are ordinarily heated by illuminating gas, which fluctuates in quality and in pressure, but I have discovered that better uniformity of heating and economy of gas can be obtained if there is a peculiar and, so far as I am advised, novel relation between the conveyer drum, the hood, and the heating flame, whereby the latter is disposed parallel to the flow of material from the hood, and extending across the conveyer just above the surface of the material thereon.

The invention is shown in the accompanying drawing wherein,

Figure 1 is a side elevation of a roaster embodying the invention, Fig. 2 is an end view,
Fig. 3 is a detail of the burner,
Fig. 4 is an elevation of a modification, and
Fig. 5 is a plan view.
The machine is similar to the one disclosed in said patent, comprising a casing 1 supported on a frame, and containing a perforated revolving drum conveyer 2 provided with inclined lifting blades 3, the drum being journaled at its ends in bearings 4 carried by the frame, and carrying a gear 6 at one end which is driven by a pinion 7 on shaft 8. The shaft 8 carries a bevel gear 9 meshing with a bevel gear 10 on a drive shaft 11, which is driven by fast and loose pulleys 12, 13. Below the drum is a pan 14 for chaff, and the casing is also provided with a chute 15, such as described in the aforesaid patent, for feeding and discharging the coffee. Attached to the stationary end plates 16 is a bar 17 carrying the double inclined hood 18, and located under the hood is a gas supply pipe 19 which is in turn connected to a gas supply pipe 20 and air sup-
ply pipe 21 passing the air through an injector nozzle 22, as seen in Fig. 3. The pipe 21 is connected through regulating valve 24 with a blower or pump 25, which is driven by chain 26 from shaft 8.

The gas burner pipe 19, instead of having radial holes, as in said patent, which form separate flames, is so constructed as to produce a continuous sheet flame extending across the conveyer substantially parallel to the path of the coffee falling from the hood 18, and above the surface of the coffee on the conveyer. In Figs. 1, 2, and 3, this is effected by drilling converging holes in pipe 18, so that the jets project toward each other and merge in a continuous flame 30. The position of the flame is adjusted by turning the pipe, and ordinarily the pipe is turned slightly in a direction opposite to that of rotation of the drum, so that the air currents caused by the drum and tending to deflect the flame, have the effect of deflecting the flame to practically a vertical position. If the pressure is increased the flame is longer, so that by adjusting the pipe position, and the pressure, complete control and positioning of the flame is had. The gas is not only all consumed, but the heat is concentrated where needed, and the continuous flame does not fluctuate as individual jets do, in response to air currents.

In Figs. 4 and 5 is shown a modified form for producing a sheet flame, wherein pipe 20 for gas, and pipe 21 for air lead to a header 32 carrying parallel pipes 33 having downwardly projecting nipples 34. The pipes are rotatably adjustable in the header 32, so that the length of the sheet flame from the burner can be adjusted by changing the angle between the nipples, and also the inclination of the whole flame can be varied by turning both pipes together in either direction. As shown in both forms, the flame is inclined slightly against the direction of rotation of the conveyer drum so that any air currents caused by the drum deflect the flame into a practically vertical position, parallel to the path of the coffee falling from the hood 18. The flame thus does not touch the coffee at any point, nor does the latter fall through the flame.

The blower 25 performs an important function in producing such pressure on the numerous converging jets as to insure that they merge into a continuous sheet flame extending across the surface of the material on the conveyer, and yet easily controllable so that just the proper heat can be obtained. Variation of the pressure will vary the length of the flame, and as each jet is inwardly directed into a common region, individual jets do not blow out. Also the steam from the coffee does not affect the mass flame as it does individual jets.

While I have shown herein a preferred form of burner for producing the results, and which has given satisfactory results in practice, it will be understood that other constructions can be used which will accomplish a similar result, but so far as I am aware, it is novel to provide in a roaster of this type a heat generator of the character described which provides a mass flame which can be adjusted and which is so largely independent of air currents, steam, etc., within the roaster.

What is claimed, is:

1. In a roaster, the combination with means for dropping coffee or the like in a vertical stream, of a heat generator producing a downwardly directed continuous sheet flame substantially parallel to the moving material.

2. In a roaster, the combination with a continuous conveyer, of a heat generator above said conveyer having means for producing a downwardly directed sheet flame extending across the conveyer and adjacent the material thereon.

3. In a roaster, the combination with a deflector, of means for feeding coffee or the like thereto, a heat generator producing a sheet flame and controllable means for directing said sheet flame substantially parallel to the stream of material discharged from said deflector.

4. In a roaster, the combination with means for lifting and dropping the material, of a deflector on which the material drops, and a heat generator below the deflector having means for producing a downwardly directed continuous sheet flame adjacent the material discharged from the deflector.

5. In a roaster, the combination with a revolving drum having lifting means, of a deflector, and a heat generator beneath the deflector adapted to produce a substantially flat sheet flame extending lengthwise of the drum.

6. In a roaster, the combination with a revolving drum having lifting means, of a deflector, and a heat generator beneath the deflector adapted to produce a continuous substantially flat flame extending lengthwise of the drum, said flame and deflector being so related to each other that the material drops from said deflector substantially parallel to said flame.

7. In a roaster, the combination with means for lifting and dropping coffee or the like in a vertical stream, of a heat generator comprising a perforated pipe having downwardly converging gas apertures, and means for supplying gas to said apertures whereby to form a continuous, downwardly directed sheet flame adjacent the descending stream of material.

8. In a roaster, the combination with a revolving conveyer having lifting means, of a deflector, a heat generator below the deflector comprising a pipe having converging gas apertures, pressure means for supplying air, and a gas nozzle connected with the gas supply adjacent the air inlet, whereby to form a continuous, downwardly directed flat flame across the surface of material on the conveyer.

9. In a roaster, the combination with means for dropping coffee or the like in separated vertical streams, of a control heat generator located between said streams for producing a directed sheet flame substantially parallel to said streams of material.

10. In a roaster, the combination with a heat generator producing a vertically directed sheet flame, of means for adjusting said flame, and means for moving the material to be roasted in proximity to said flame.

11. In a roaster, the combination with a heat generator producing a downwardly directed sheet flame, of a conveyer for moving the material transversely of and below the flame, and means for angularly adjusting the position of the flame.

Signed at New York city, in the county of New York and State of New York this twelfth day of April A. D. 1918.

EDWARD F. SCHNUCK.